US012159724B2

United States Patent
Morin et al.

(10) Patent No.: US 12,159,724 B2
(45) Date of Patent: Dec. 3, 2024

(54) PWR THAT ENABLES STEAM GENERATOR SECONDARY FLUID TO FLOW INTO PRIMARY CIRCUIT AND REACTOR VESSEL DURING A CORE MELT

(71) Applicant: COMMISSARIAT A L'ENERGIE ATOMIQUE ET AUX ENERGIES ALTERNATIVES, Paris (FR)

(72) Inventors: Franck Morin, Aix en Provence (FR); Gilles Avakian, Marseilles (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 495 days.

(21) Appl. No.: 17/443,994

(22) Filed: Jul. 29, 2021

(65) Prior Publication Data
US 2022/0037042 A1    Feb. 3, 2022

(30) Foreign Application Priority Data
Jul. 29, 2020    (FR) ..................... 20 08045

(51) Int. Cl.
*G21C 15/18*    (2006.01)
*G21C 9/016*    (2006.01)
*G21C 9/02*    (2006.01)

(52) U.S. Cl.
CPC ............. *G21C 15/18* (2013.01); *G21C 9/016* (2013.01); *G21C 9/022* (2013.01)

(58) Field of Classification Search
CPC ........ G21C 15/18; G21C 9/016; G21C 9/022; G21C 9/00
USPC .................................... 376/280, 282
See application file for complete search history.

(56) References Cited

U.S. PATENT DOCUMENTS 11,901,088 B2 *  2/2024 Singh ..................... G21C 15/18

FOREIGN PATENT DOCUMENTS

| CN | 111540487 A | * | 8/2020 | ............. G21C 15/18 |
| EP | 0 907 187 A1 | | 4/1999 | |
| FR | 2 763 168 A1 | | 11/1998 | |
| WO | WO 2009/053322 A1 | | 4/2009 | |

OTHER PUBLICATIONS

French Preliminary Search Report issued Apr. 28, 2021 in French Application 20 08045 filed on Jul. 29, 2020, 8 pages (with English Translation of Categories of Cited Documents & Written Opinion).

* cited by examiner

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

A PWR includes a secondary circuit that is normally fluidly isolated from the primary circuit. The secondary circuit includes secondary fluid in a steam generator. In response to detection of a core melt, the secondary circuit is placed in fluidic communication with the primary circuit, so that secondary fluid from the steam generator can flow into the primary circuit and then into the reactor vessel.

10 Claims, 11 Drawing Sheets

US 12,159,724 B2

PWR THAT ENABLES STEAM GENERATOR SECONDARY FLUID TO FLOW INTO PRIMARY CIRCUIT AND REACTOR VESSEL DURING A CORE MELT

DOMAIN OF THE INVENTION

The invention relates to the field of safety of nuclear plants and more particularly the management of serious accidents of pressurised water nuclear reactors (PWR). Still more specifically, the present invention applies to the management of accidents involving the formation of a corium bath at the vessel bottom, following a serious accident occurrence situation, in the context of a strategy for keeping or retaining the corium in the vessel.

TECHNOLOGICAL BACKGROUND

A PWR-type nuclear plant is illustrated in FIGS. 1 and 2.

In general, such a plant comprises a containment enclosure 600 inside which the reactor 1 is housed. The reactor 1 comprises a vessel 10 forming, together with a cap 20, a tight enclosure. This tight enclosure accommodates the fuel assemblies of the core 30. In FIG. 2, for clarity, the core is represented by an area in dotted lines.

The vessel 10 further comprises at least one so-called cold fluid inlet 13, connected to a primary circuit 100 and at least one so-called hot outlet 14, also connected to the primary circuit 100. Pressurised water circulates in the primary circuit 100.

Thus, during normal operation of the reactor 1, the primary circuit 10 ensures the transport of heat from the core 30 towards a secondary circuit 200 inside which water also circulates.

The secondary circuit 200 comprises one and preferably several steam generator(s) 210. The heat exchange between the primary circuit 100 and the secondary circuits 200 is done inside the steam generators 210. In the example illustrated in FIG. 1, a loop 214 of the primary circuit 100 is illustrated in the steam generator 210.

The simplified diagrams of FIGS. 1 and 2 illustrate other perfectly classical elements of a primary circuit 100 and of a reactor 1 core 30 such as: control rods 40, a hydraulic pump 102 at the vessel 10 inlet to make water circulate in the primary circuit 100, a pressuriser 110 at the vessel 10 outlet, a containment enclosure 600, and structures forming a sill 601 and walls 602 delimiting a vessel 10 well 603.

Still during normal operation of the reactor 1, upon its passage into the steam generator 210, a portion of the water of the secondary circuit 200 vaporises and reaches an energy conversion device such as a turbine 220 movably driven by the depressurisation of the steam. Afterwards, the mechanical energy at the output of the turbines 220 is transformed into electrical energy by generators 500 and transformers 510 before being conveyed towards the consumption sites.

At the outlet of the turbines 220, the fluid condenses in a condenser 230 before being injected again in the steam generators 210 by a pump 240.

In order to condense the steam derived from the turbines 220, the condenser 230 is cooled down by an open circuit 300 fed by a water source 310 such as a river. This circuit 300 also comprises lift pumps 320, 330 and a cooling tower 340.

As it clearly appears in the diagram of FIG. 1, the water of the primary circuit 100 is intended to extract calories generated by the reactor 1 in order to transfer them to the secondary circuit 200, to transform them into electricity using an energy conversion system such as a turbo-generator. During normal operation, the core 30 is critical, and the produced thermal power is evacuated by the primary circuit 100. Monitoring of the criticality of the core is ensured by the position of the control rods 40 in the core 30, but also by a content of water-soluble boron in the water of the primary circuit.

Different accidental scenarios such as a large breach type primary coolant loss accident, combined with aggravating factors such as a failure of the classified emergency systems, could lead to a serious accident occurrence situation.

Henceforth, it follows that the core 30 switches into a meltdown state with the generation of corium. Corium is a partial or total set of molten fuels of vessel internals 10 in the molten state. The corium flows by gravity into the bottom 12 of the vessel 10 and forms a bath therein. Hence, the corium includes all or part of the molten fuel stock, containing all solid fission products and the residual thermal power associated thereto.

FIGS. 3A to 3C illustrate, in a very schematic way, a serious accident of a PWR vessel with the formation of a corium bath and then piercing of the vessel.

In FIG. 3A, the disaggregation and the partial meltdown of the core 30, the formation of corium 70 and the apparition of a corium 70 bath 71 at the vessel 10 bottom 12 are illustrated. In a known manner, upon the formation of the corium 70 bath 71, a surface liquid metal layer 72 appears at the free surface of the bath 71. A portion of the thermal power of the corium 70 bath 71 is transmitted to this layer 72.

FIG. 3B illustrates, in a very schematic way, the apparition of this metallic layer 72 (whose thickness is intentionally exaggerated for clarity). The area bearing the reference A illustrates the beginning of piercing of the vessel 10 by the metallic layer 72. This piercing of the vessel 10 is caused by a phenomenon commonly called "focusing effect". The metallic layer 72 is a good heat conductor and absorbs a large portion of the thermal energy of the corium bath 71. The focusing effect corresponds to a situation in which the metallic layer 72 transfers a portion of its heat by conduction over a small surface of the lateral walls 11 of the vessel 10. This thermal power focusing on a small surface could result in piercing of the walls 11 of the vessel 10.

FIG. 3C illustrates the completion of piercing of the vessel 10. The corium 70 then spills out in the vessel 10 well 603. Moreover, upon direct contact between the corium and the cooling water contained in the well 603, explosions, called steam explosions (abrupt depressurisation of water and expansion of steam), and the creation of hydrogen. These consequences are unacceptable given the risk of break-up of the third containment barrier formed by the reactor enclosure 600. The risk of vessel piercing, in a soaked vessel 10 well 603 situation, shall be eliminated. In addition, it is essential to avoid uncontrolled dispersals of corium 70, a highly radioactive material having a very high thermal power. A dispersal of corium 70 at the sill 601 level generates a risk of piercing of the latter and a propagation down to potential phreatic areas.

There are two modes of management of the corium in the event of a Serious Accident in a PWR depending on the designers of the PWER nuclear boiler. A first range of solutions, referred to as Ex Vessel Retention, consists in letting the corium 70 pierce the vessel 10, with the primary circuit depressurised, and flow in an area intended for spreading of the corium and for the management of cooling thereof. This type of solutions has the drawback of requiring an impressive platform for the reception and spreading of corium called recuperator, which considerably weighs down the structure to be built and the infrastructure cost of the reactor enclosure. Another major drawback relates to the demonstration of integrity of the third containment barrier formed by the reactor enclosure, to avoid the contamination of the environment, since the containment barrier formed by the primary circuit has been broken.

A second range of solutions, referred to as In Vessel Retention or by its acronym IVR, consists in deploying systems for keeping the corium 70 inside the vessel 10 by avoiding piercing of the latter.

In this range of solutions, one strategy aims to keep the corium 70 in the vessel 10 and to extract its residual power through the wall of the vessel 10 by means of an external cooling, in particular through the set-up of a (natural or forced) convection loop, after soaking of the vessel 10 well 602.

This type of solutions is described for example in the document WO2009/053322. In this document, a pump located at the bottom of the vessel allows increasing the forced convection of water located in the vessel well 603 in contact with the outer wall of the vessel 10.

A natural circulation of water in contact with the vessel, and then vaporised and condensed again at the upper portion of the enclosure may also be set up. This type of solutions is suggested for managing the evacuation of the residual power in the event of a serious accident in the AP1000 reactor of the company Westinghouse™. This cooling means is completely passive, in contrast with the solution described in the document WO2009/053322.

Moreover, depending on the considered assumptions regarding the thickness of the metallic layer 72 at the origin of the focusing effect, the likelihood of not reaching sufficient cooling performances to avoid piercing of the vessel still remains. That is why in general, even in the context of an IVR management of the serious accident, complementary devices for treating the hydrogen risk, and a study on the limitation of the consequences of the steam explosion is described, with additional means provided, in order to treat the worst-case assumption of vessel piercing.

An IVR strategy, described in the document FR2763168 consists in providing a device for recovering the corium at the bottom of the vessel. The corium flows by gravity from the core up to this recuperator. Moreover, it is provided for an injection of water by gravity by an additional tank connected to the vessel well.

This solution has the drawback of requiring the presence of an additional system formed by the recuperator, which weighs down and substantially enlarges the size of the reactor vessel. In addition, the means for injecting water into the vessel formed by the tank directly connected to the primary circuit are only but a backup injection means complementary to those already present for the treatment of sizing accidents. The residual primary pressure prevailing upon the occurrence of the serious accident requires providing for a considerable gravity height of this tank, which considerably weighs down the structure to be built.

Consequently, all of the few solutions that have been suggested to manage cooling of the corium have drawbacks. There is a need for providing a solution limiting, and possibly suppressing, at least some of these drawbacks. The present invention aims such an objective.

Another objective of the present invention consists in reducing, and possibly eliminating, the risk of piercing of the vessel by focusing effect.

SUMMARY

To achieve at least one of these objectives, the present invention provides for a safety method for a pressurised water nuclear reactor for the event of a meltdown, at least partially, of a core of the reactor with the formation of a corium bath, the reactor comprising, during an operation phase, at least:
  a primary circuit in which a water-based primary fluid is intended to circulate, the primary circuit being configured so that the primary fluid penetrates into a vessel of the reactor and crosses the core contained within the vessel in order to extract heat produced by the core,
  a secondary circuit, in which a water-based secondary fluid is intended to circulate, the secondary circuit being fluidly isolated from the primary circuit, and comprising at least one steam generator, the secondary circuit being configured so as to absorb heat from the primary circuit and transform it, at least partially, into steam in the steam generator.

The method comprises at least the following step. In response to a detection of an event characterising a meltdown, at least partially, of the core of the reactor with the formation of a corium bath in a bottom of the vessel and with a formation of a liquid metallic layer at the surface of the corium bath, the method provides for setting the secondary circuit in fluidic communication with the primary circuit so that the secondary fluid follows the primary circuit, preferably by the cold branch side, to flow inside the vessel over said liquid metallic layer of the corium bath.

Thus, the pressurised secondary fluid, typically water at saturation pressure and temperature, contained in the secondary circuit and in particular in the steam generator(s) flows into the bottom of the vessel over the metallic layer.

Hence, this coolant injection is performed in a passive way since the water of the secondary circuit is at a higher pressure than that of the primary circuit.

Typically, the pressure of the water contained in a steam generator is in the range of 60 to 70 bars, while that of the primary circuit is typically lower than 20 bars when a Serious Accident situation occurs.

In a very short time, the water of the secondary circuit starts coming into contact with the overmelting liquid metal layer causing a drastic reduction of the heat flow at the origin of the piercing by focusing effect. All or part of the water from the secondary circuit vaporises on contact with the liquid metal layer and with the corium bath, by running off along the reactor vessel on the cold branch side, advantageously along a volume commonly called downcomer.

Water from the secondary circuit flows over a period that is long enough to cool down the liquid metal layer at least over the entire period during which this liquid metal layer has a thickness that is small enough to generate a risk of piercing of the vessel. Thus, it is possible to consider this flow as monitored. However, the flow rate of the flow flowing over the liquid metallic layer has not to be very high.

One way for managing this flow rate and this duration of water injection from the secondary circuit into the vessel consists in accurately calibrating the section of the opened breach(es) between the secondary circuit and the primary circuit.

As a non-limiting example, the flow rate of secondary water coming into the vessel is that corresponding to a breach with a diameter of about 20 mm and more generally between 10 and 30 mm.

All of the water contained in one or several steam generator(s) (GV) then progressively flows into the reactor vessel. The typical value of the liquid flow rate coming into the primary circuit from the secondary circuit is about 5 kg/s. As a non-limiting example, this flow rate is more generally comprised between 2 kg/s and 10 kg/s. This value is drastically lower than all safety injections intended to soak the core. Thus, the method according to the invention allows for a long duration of transfer of water from the GV towards the area of a potential piercing of the vessel by focusing effect, but also for a significant limitation of the steam created by the water/liquid metal interaction, which limits overpressure in the primary circuit.

Also as a non-limiting example, the duration of water injection from the secondary circuit into the vessel is in the range of three hours and more generally between 30 min and 5 hours. For comparison, in a solution that would consist in soaking the core by pouring water from the secondary circuit into the vessel, the duration of injection would last from about one minute to a few minutes.

Depending on the accidental scenarios, the available amount of water per steam generator varies between 29 tons and 70 tons per steam generator for a reactor having a power of 1300 MWe (the French Palier N4 type).

With regards to the time scale of a serious accident and more particularly with regards to the time scale of the meltdown of the core and of the formation of corium, the time during which water from the secondary circuit flows over the corium bath is short when implementing the method according to the invention.

Nevertheless, in the context of development of the present invention, it has been observed that this duration is sufficient to quite significantly reduce, and even to eliminate, the risk of piercing of the vessel by focusing effect.

Indeed, it has been noticed that the time period during which the focusing effect could cause piercing of the vessel is relatively limited. It has been observed that the risk of piercing due to the focusing effect corresponds to a time interval where the corium bath has a liquid metallic layer at the surface with a relatively small thickness, typically of few centimetres. In this configuration, a large portion of the thermal power derived from the corium bath is transmitted to this thin metallic blanket, which power is then transmitted by contact to the inner wall of the vessel, and induces the progressive piercing of the latter.

Over time, the corium bath continues to be fed by the inner elements of the vessel which progressively melt down, and the liquid metal layer at the surface thickens, because of the stock of molten metal that increases. The contact surface between the liquid metal layer and the inner wall of the vessel increases. The thermal power transmitted to this later is then distributed across a larger thickness of the liquid metallic layer, and the vessel piercing power is then less concentrated. The risk of vessel piercing then becomes lower.

Once all of the inner metal stock has molten, the thickness of the surface metallic layer is then such that the thermal power at the periphery and in contact with the vessel is no longer sufficient to pierce the vessel. In general, at this level, the external cooling of the vessel is sufficiently effective to evacuate the thermal power derived from the bath. Piercing of the vessel is then definitely stopped.

For example, if 3 MWth are transmitted to a metallic layer with a thickness of 10 cm and with a periphery of 12 m, without any possibility for thermal evacuation by the upper surface, then there would be a heat flow applied to the vessel of $3/1.2=2.5$ mw/m$^2$. Such a flow cannot be evacuated by conventional external cooling when the vessel is drowned in a soaked vessel well. The excess thermal power transmitted to the vessel is then transformed into a melting heat of the vessel itself and piercing of the vessel occurs from inside. Once the liquid metallic layer reaches a doubled or tripled thickness, the flow is then reduced by so much and the external cooling then becomes sufficient to stop the progress of piercing of the vessel since the entire thermal power derived from the bath is evacuated up to the external water, without causing a meltdown of the vessel metal.

When the secondary liquid water comes into contact with the liquid metal layer from the cold branches of the primary circuit, preferably at the location of piercing of the vessel, that is to say at the periphery of the downcomer as will be described in detail later on, each kilogram of water per second that evaporates induces a cooling of the liquid layer by about 2 to 3 MWth. With a flow rate of about 5 kg/s over a period of about 3 hours, cooling of the liquid metal layer corresponds to an evacuation of thermal power of about 10 to 15 MWth over three hours, which drastically reduces and even prevents piercing of the vessel.

In addition, once the corium bath reaches a given height, the liquid metal layer at the surface comes into contact with the core support plate, illustrated in FIGS. 2 and 3A by the reference 17. The temperature of the liquid metal overheated by the thermal power of the corium bath is then drastically reduced by the significant meltdown of the lower portion of the core support plate. Indeed, the melting point of the metal is well below that which is likely to be reached by the liquid metal layer thereby causing the focusing effect.

Thus, in the context of the development of the present invention, it has been noticed that it was possible to effectively fight piercing of the vessel by focusing effect by injecting an amount of water at a relatively low flow rate inside the vessel. The volume of water contained in the steam generators is then large enough to effectively cool down the liquid metal layer over the entire period during which the liquid metal layer has a thickness that is small enough for the Focusing effect phenomenon to cause piercing of the vessel.

In a particularly advantageous manner, the invention does not require any additional components in the reactor, such as a recuperator, or additional systems in the vessel well, such as forced convection means.

Moreover, the invention does not require any additional tanks placed at a substantial height. Yet, by taking advantage of the pressure of the secondary circuit, the invention allows for a very quick water injection.

However, it is necessary to provide for cooling the outer wall of the vessel, in the configuration of holding the corium within the vessel, and for cooling by soaking the vessel well.

Hence, the suggested solution allows for a passive operation, that is to say without any pump to pour a coolant over the corium bath, an enhancement of the strategy for managing the corium within the vessel, by fighting the effects of the Focusing Effect likely to jeopardise the success in preventing piercing of the reactor vessel.

Moreover, the invention does not provide for additional components or for tappings directly on the reactor vessel, these might cause a reduction of the reliability of the reactor safety.

Thus, the invention allows considerably enhancing the safety of a pressurised water reactor in the event of a meltdown of the core with the formation of a corium bath.

The invention also covers a pressurised water nuclear reactor comprising at least:
- a vessel accommodating a core of the reactor, the vessel comprising at least one inlet and at least one outlet,
- a primary circuit at least one first end of which is connected to the inlet of the vessel and at least one end of which is connected to the outlet of the vessel so that a primary fluid, preferably water-base, circulating in the primary circuit penetrates into the vessel of the reactor through said inlet and comes out through said outlet while passing throughout the core in order to extract heat produced by the core, a secondary circuit, fluidly isolated from the primary circuit, in which a water-based secondary fluid is intended to circulate, and comprising at least one steam generator, the secondary circuit being configured so as to absorb heat of the primary circuit and transform it, at least partially, into steam in the steam generator.

The reactor comprises a safety system comprising a safety device configured so as to create a passage, and preferably only one passage, suppressing the fluidic insulation between the secondary circuit and the primary circuit and setting the secondary fluid present in the at least one steam generator in fluidic communication with the primary circuit so that the secondary fluid contained in the steam generator flows in a bottom of the vessel while passing beforehand through the primary circuit.

Thus, in case of activation of the safety device when a corium bath is forming and a liquid metallic layer appears at the surface of the bath, the safety device is activated and the pressurised secondary fluid contained in the steam generator is poured into the primary circuit, advantageously into the cold branch(es) and then into the vessel. This fluid cools down the liquid metallic layer, which attenuates the focusing effect phenomenon. Thus, piercing of the vessel is avoided.

In a particularly advantageous manner, it should be noticed that the suggested solution provides for no direct tapping of the secondary circuit on the reactor vessel, which improves the safety of the reactor.

This device has the advantages mentioned before with regards to the method of the invention. In particular, it allows considerably improving the safety of the reactor, without complicating or reducing the reliability level of the latter.

According to a non-limiting example, the member is a valve selected amongst: a valve, a manually-operated valve, a remote-controllable valve.

$S_{breach}$ is the minimum section of said passage that enables the injection, inside the primary circuit, of the secondary fluid present in the at least one steam generator.

According to a non-limiting example, $S_{breach}$ is smaller than 20 cm² ($10^{-2}$ meters).

According to one example, $S_{breach}$ is larger than 2 cm², and preferably $S_{breach}$ is larger than 3 cm². According to one example, $S_{breach}$ is comprised between 2 cm² and 20 cm².

According to one example, $S_{breach}$ is comprised between 0.2 cm² and 20 cm², preferably 0.8 cm² and 20 cm² and still more preferably between 2 cm² and 7 cm².

The inlet section on the cold branch side of the reactor vessel is much larger than the section of the breach created between the secondary circuit and the primary circuit.

Typically, according to a non-limiting example, $S_{breach}<0.05*S_{inlet}$, preferably $S_{breach}<0.01*S_{inlet}$, preferably $S_{breach}<0.005*S_{inlet}$ and preferably $S_{breach}<0.001*S_{inlet}$. $S_{inlet}$ is the minimum section of the passage of the primary fluid in the primary circuit and up to the vessel.

If the primary circuit includes several inlets in the vessel, which is the case when there are several steam generators, then the section $S_{inlet}$ is the sum of the sections of the inlets of the primary circuit up to the vessel.

Typically, the passage section of the primary fluid on the cold branch side is in the range of 6000 cm².

Typically, when $S_{inlet}$ has a circular section, $S_{inlet}$ has a diameter comprised between 800 and 900 mm ($10^{-3}$ meters).

Thus, the section through which the secondary fluid flows into the primary circuit is much smaller than the section through which the primary fluid usually flows in the vessel. This ratio of the sections $S_{breach}$ and $S_{inlet}$ allows injecting into the primary and therefore into the vessel a secondary fluid flow over a relatively long time period. More specifically, over a time period that is long enough to cover the duration during which the thickness of the liquid metallic layer is small enough to pierce the wall of the vessel by focusing effect.

These features allow reducing, and possibly suppressing, the risk of piercing of the vessel by focusing effect.

BRIEF INTRODUCTION OF THE DRAWINGS

The aims, objects, as well as the features and advantages of the invention will appear better from the detailed description of embodiments of the latter which are illustrated by the following appended drawings wherein:

FIG. 1 schematises a PWR-type nuclear plant.

FIG. 2 schematically illustrates a vertical section of a PWR-type reactor vessel in its vessel well in an operating state excluding a serious accident situation.

FIGS. 3A to 3C schematically illustrate different phases of a serious accident resulting in the partial or total meltdown of the core, the formation of a corium bath and then piercing of the vessel in the reactor illustrated in FIG. 2 by focusing effect.

FIG. 4 schematically illustrates the implementation of the invention with cooling of the corium bath by injection of water from the secondary circuit through the primary circuit up to the bottom of the vessel.

Figure 9:
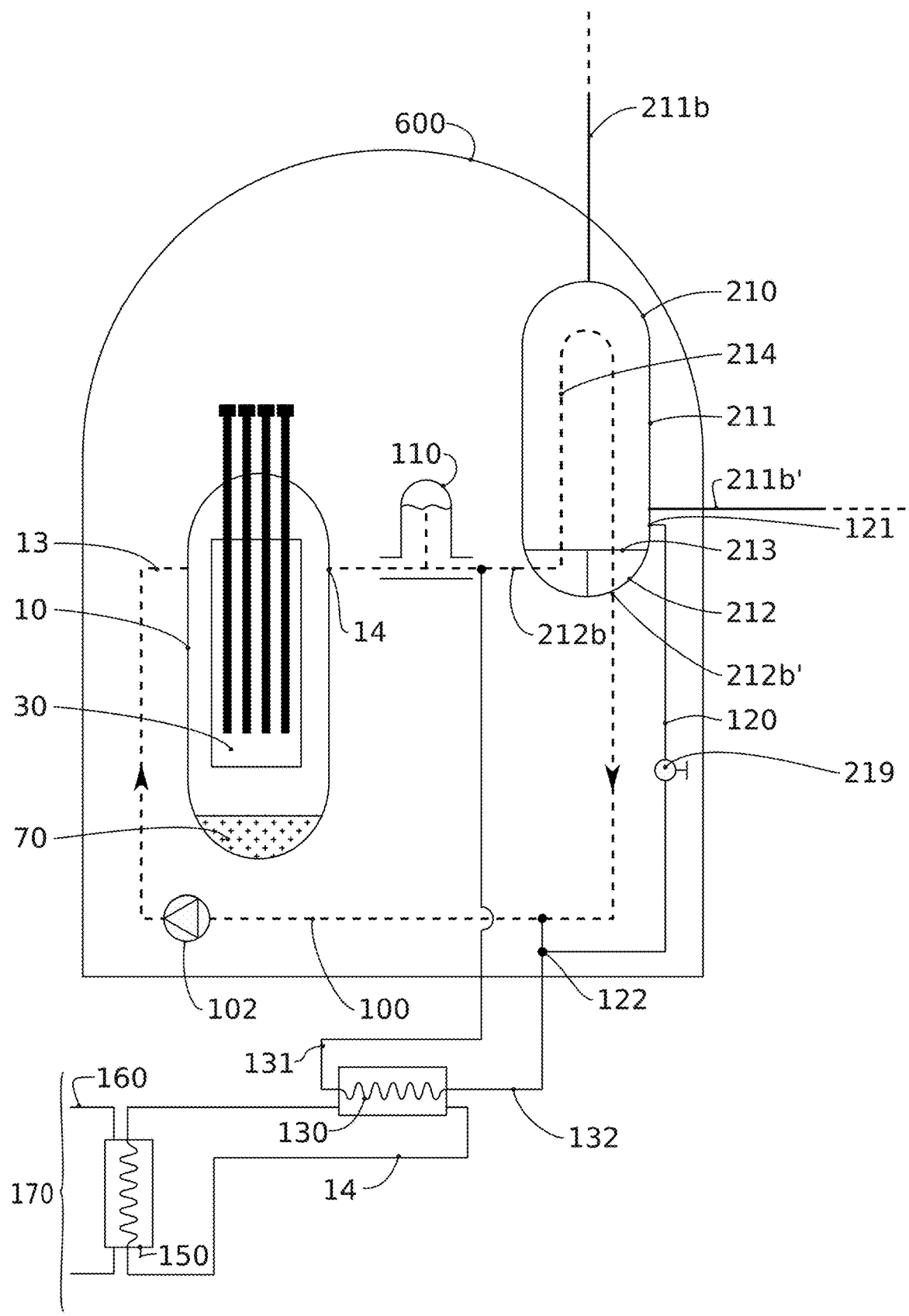

FIG. 9 schematically illustrates a set-up of a power plant integrating a safety system according to a third embodiment of the invention.

The drawings are provided as examples and do not limit the invention. They represent block diagrams intended to facilitate understanding of the invention and are not necessarily to the scale of practical applications. In particular, the relative dimensions of the different constituent elements of the plant, in particular the relative dimensions of the constituent elements of the reactors and its pipes, of the liquid metallic layer, and of the different members of the plant do not represent reality.

DETAILED DESCRIPTION

Before starting a detailed review of embodiments of the invention, it should be recalled that the invention according to its first aspect possibly comprises in particular the optional features hereinafter which could be used in combination or alternatively.

According to one example, said detection of the formation of a liquid metallic layer at the surface of the corium bath is performed using at least one fuse disposed on a wall of the vessel, the at least one fuse being configured so as to melt down when the liquid metallic layer reaches it.

According to one example, the at least one fuse has a melting temperature of the fuse higher than or equal to a temperature threshold Tf, with Tf≥400° C., preferably Tf≥500° C. and preferably Tf=600° C.

According to one example, the reactor comprises several fuses distributed according to at least one generatrix of a wall of the vessel so that two neighbouring fuses define a vessel slice, the volumes $V_{slice}$ of the slices being identical.

According to one example, setting of the secondary circuit in communication with the primary circuit is triggered according to the detection, for example using at least one fuse, of a temperature of the inner wall of the vessel higher than a temperature threshold Tf, with Tf higher than 400° C. and preferably Tf higher than 500° C.

According to one example, a profile of the evolution of the height of the liquid metallic layer in the vessel is determined by means of fuses disposed over an inner wall of the vessel and preferably disposed according to at least two generatrices of this wall. The time point at which the secondary circuit is set in fluidic communication with the primary circuit is determined according to this profile.

Preferably, a series of fuses is disposed over an inner face of the wall of the vessel. Preferably, the fuses are placed over a generatrix of the bottom of the vessel and of a lateral wall of the vessel. The progress of the corium level rise, as well as the beginning of degradation of the vessel by the liquid metal layer at the surface thereof is detected by the successive deactivation of the fuses of this generatrix. Starting from a determined corium height, the activation of the fluidic communication is activated.

According to one example, the reactor comprises at least one fuse over a wall of the vessel. The fuse is configured so that, when the liquid metallic layer reaches the fuse, it makes the latter melt down. For example, the melting temperature of the fuse is higher than or equal to a temperature threshold Tf, with Tf≥350° C., preferably Tf≥450° C. and preferably Tf=600° C.

According to one example, the reactor comprises several fuses distributed according to at least one generatrix of a wall of the vessel. The fuses are disposed along a generatrix so that if the volume of the liquid metallic layer increases at a constant rate, the time intervals separating the time points at which two successive fuses of a generatrix are reached by the liquid metallic layer remain constant.

According to one example, the secondary fluid flows inside the vessel over the liquid metallic layer at least over the entire period during which the liquid metallic layer has a thickness $e_{72}$ that is small enough to pierce at least partially an inner wall of the vessel.

According to one example, the secondary fluid flows inside the vessel over the liquid metallic layer during at least thirty minutes and preferably during at least one hour and preferably during at least two hours.

According to one example, the secondary water flow runs in the primary circuit throughout a passage whose minimum section $S_{breach}$ is comprised between 0.2 cm² (0.2·10⁻⁴ m²) and 20 cm² and preferably between 0.8 cm² and 7 cm². If the minimum section $S_{breach}$ of this passage is circular, then its diameter is comprised between 5 and 50 mm and preferably between 10 and 30 mm. Typically, this diameter is about 20 mm.

According to one example, the secondary fluid flows inside the vessel (10) with a flow rate lower than 10 kg/s (10³ grams/second) and preferably lower than 7 kg/s.

According to one example, the reactor comprises an inner envelope, located inside the vessel, enveloping the core and defining with an inner wall of the vessel an annular volume called downcomer, the downcomer being configured so that, during the normal operation of the reactor:
  the inlet opens into the outside of the envelope and into the downcomer so that the primary fluid coming from the inlet is guided up to the bottom of the vessel,
  the outlet opens into the inside of the envelope so that the primary fluid present in the core could come out of the reactor through the outlet.

The reactor is configured so that when the explosive device creates the at least one passage suppressing the fluidic insulation between the secondary circuit and the primary circuit, the secondary fluid contained in the steam generator then flows in a bottom of the vessel while passing beforehand through said inlet of the vessel and then through the downcomer.

This embodiment promotes a run-off of the secondary water over the inner walls of the vessel. This allows cooling down the liquid metallic layer even more effectively than in the case where the secondary fluid penetrates into the vessel from the outlet of the latter, or on the hot branch side, and therefore without passing through the downcomer. Indeed, by running off on the downcomer side, the evaporation of the secondary water, and therefore cooling of the liquid metal layer, takes place in the area where piercing of the vessel is located. To reach this embodiment, the connection on the secondary side should be performed on the cold branch side of the steam generator, that is to say on the heat-exchanger side where the primary temperature corresponds to the cold return of the primary circuit (cold water box).

According to one example, the reactor comprises at least one fuse disposed on a wall of the vessel, the fuse being configured so that, when the liquid metallic layer reaches the fuse, it makes the latter melt down, the melting temperature of the fuse being higher than or equal to a temperature threshold Tf, with Tf 400° C., preferably Tf≥500° C. and preferably Tf=600° C.

According to one example, the reactor comprising several fuses distributed according to at least one generatrix of a wall of the vessel, the fuses are distributed along a generatrix so that two neighbouring fuses according to this generatrix, define a vessel slice, the volumes Vslice of the slices are identical.

According to one example, the steam generator comprises an envelope enclosing the secondary fluid and the primary fluid, the envelope enclosing an insulation fluidly isolating the secondary and primary fluids, the safety system being configured so as to suppress the insulation between the secondary and primary fluids inside the envelope of the steam generator, thereby creating said passage. The suppression of this insulation corresponding to a breach with a limited and monitored diameter (typically 20 mm in diameter).

According to one example, the steam generator comprises an outer envelope comprising a first portion enclosing the primary fluid and a second portion enclosing the secondary fluid, the first and second portions being fluidly isolated from one another.

The safety system comprising at least one pipe located outside the steam generator, the pipe forming said passage, and having at least:
  a first end opening onto the second portion enclosing the secondary fluid,
  a second end opening into a branch of the primary circuit located between the steam generator and the vessel.

The safety device includes at least one member mounted on said pipe and selectively featuring:

a closed configuration in which it prevents the passage of the fluid in said channel, an open configuration in which it enables the passage of the fluid in said pipe, thereby enabling the secondary fluid of the steam generator to flow in said pipe to join the primary circuit and then the vessel.

According to one example, the second end of the pipe forms a tapping on a piping line connected to a branch of the primary circuit.

According to one example, said branch of the primary circuit extends between the steam generator and the inlet of the vessel.

According to one example, the reactor comprises a device selected amongst a safety injection line (IS) and a line of a volumetric and chemical control circuit (RCV), said device being configured so as to open into the primary circuit at said second end of the pipe.

According to one example, the steam generator comprises a first portion enclosing the primary fluid and a second portion enclosing the secondary fluid, the first and second portions being fluidly isolated from one another.

The reactor further comprises a device for cooling down the reactor at stop RRA, the RRA device comprising at least one first circuit comprising a heat-exchanger and branches fluidly connecting the heat-exchanger to one or several portion(s) of the primary circuit.

According to one example, the safety system comprising at least one pipe located outside the steam generator, the pipe forming said passage and having at least:

a first end opening into the second portion enclosing the secondary fluid, a second end opening into a branch of said first circuit of the RRA device.

The safety device includes at least one member mounted on said pipe and selectively featuring:

a closed configuration in which it prevents the passage of the fluid in said pipe, an open configuration in which it enables the passage of the fluid in said pipe, thereby enabling the secondary fluid of the steam generator to flow in said pipe to join a branch of said first circuit, and then the primary circuit and then the vessel.

This embodiment has the advantage of avoiding any tapping on the primary circuit. This enhances the safety of the reactor even more.

According to one example, the safety device is configured so that the secondary fluid contained in the steam generator flows in the vessel with a flow rate comprised between 4 and 5 kg/s for a pressure of the steam generator in the range of 68 bar.

Thus, even with the limited amount of cooling fluid, the focusing effect phenomenon could be slowed down and the piercing of the vessel could be avoided.

The terms "substantially", "about", "in the range of" means while taking into account the manufacturing and/or measurement tolerances and could in particular correspond to "within 10%".

In the following description, a normal operation of the reactor 1 or of the plant refers to an operating phase in the absence of accidents or serious accidents. An accident such as a primary coolant loss, a large breach or a very large breach accident does not represent a normal operation phase of the reactor 1.

The invention will now be described in detail with reference to FIGS. 4 to 9.

Figure 1:
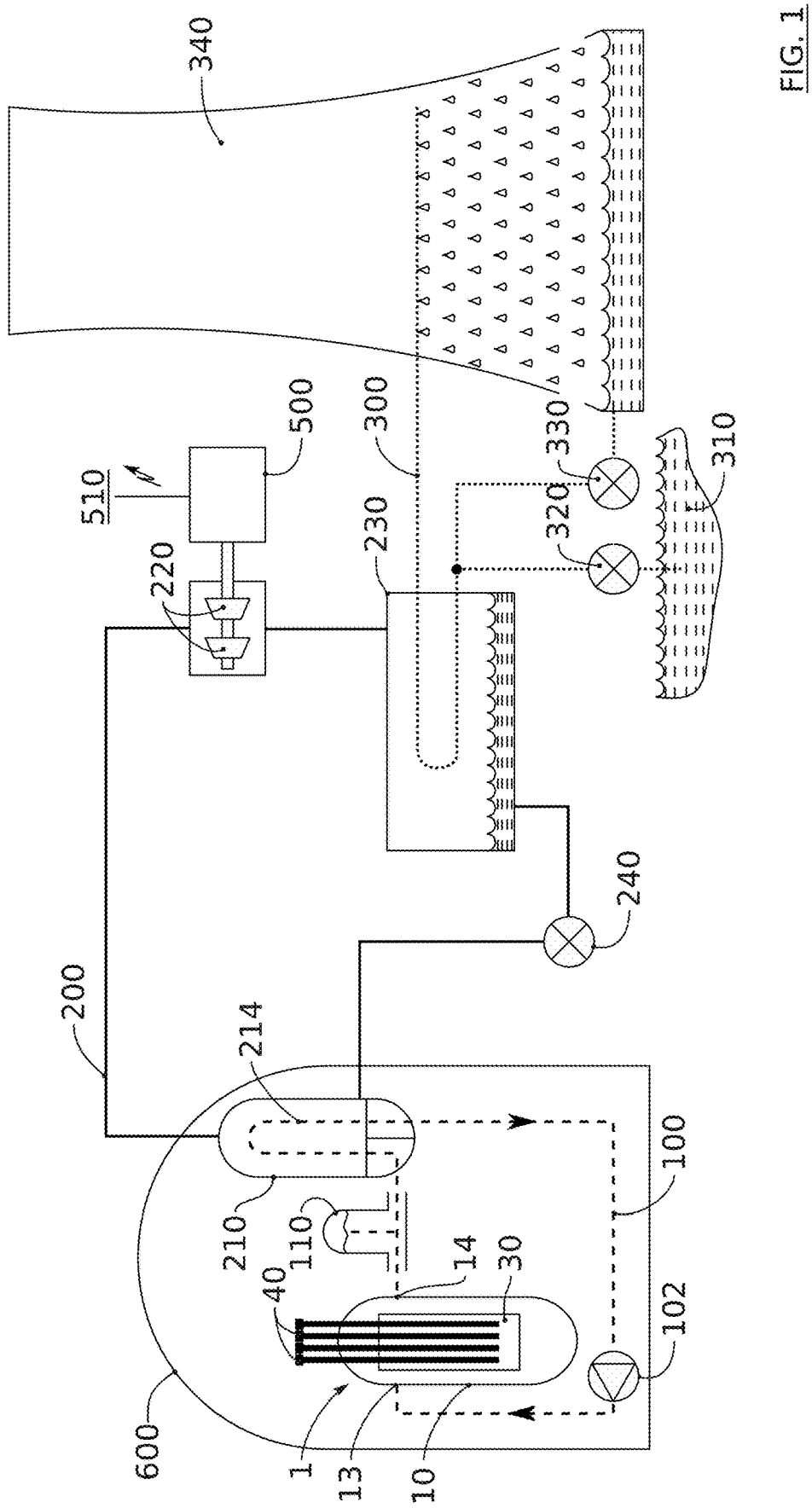
Figure 2:
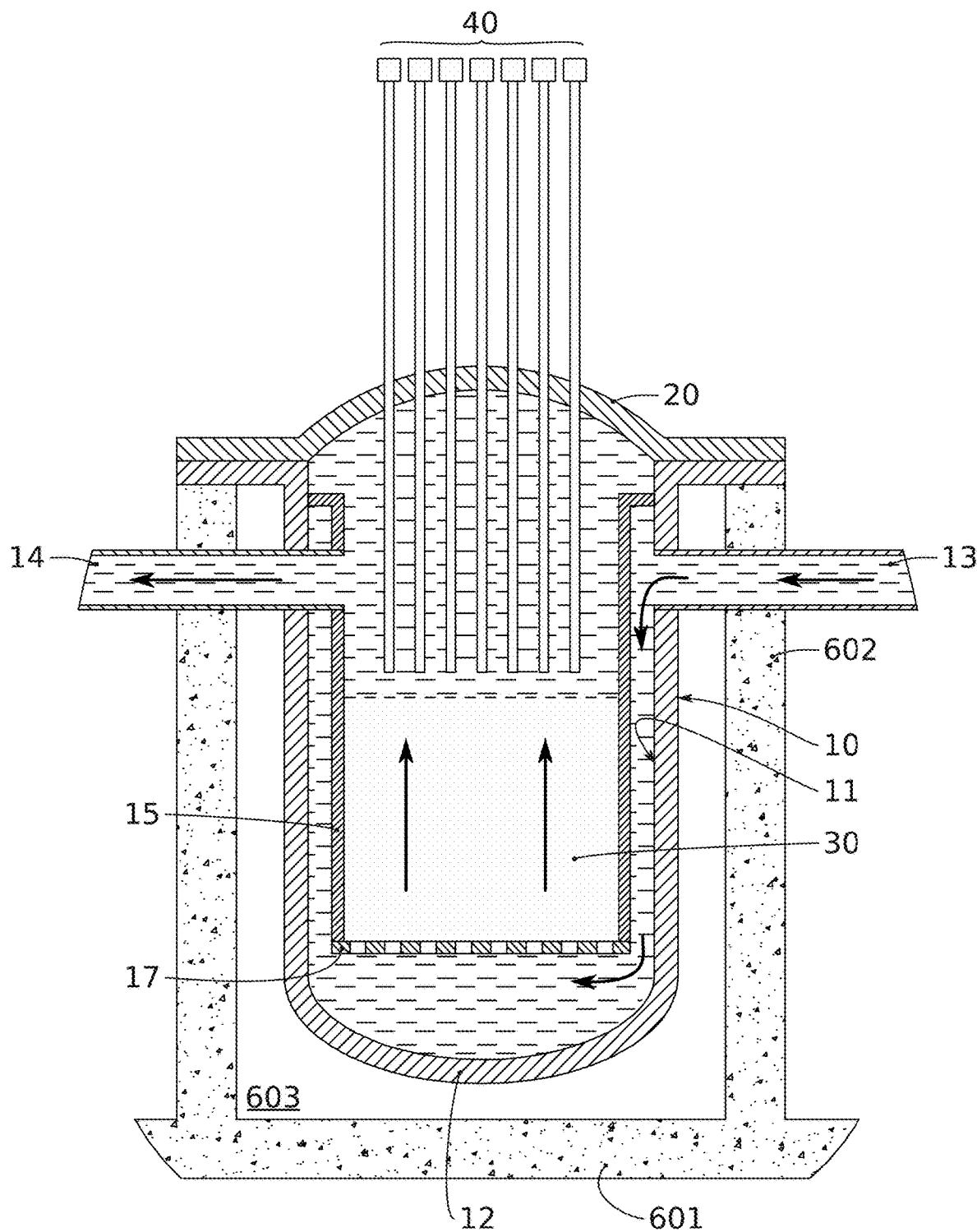
Figure 3A:
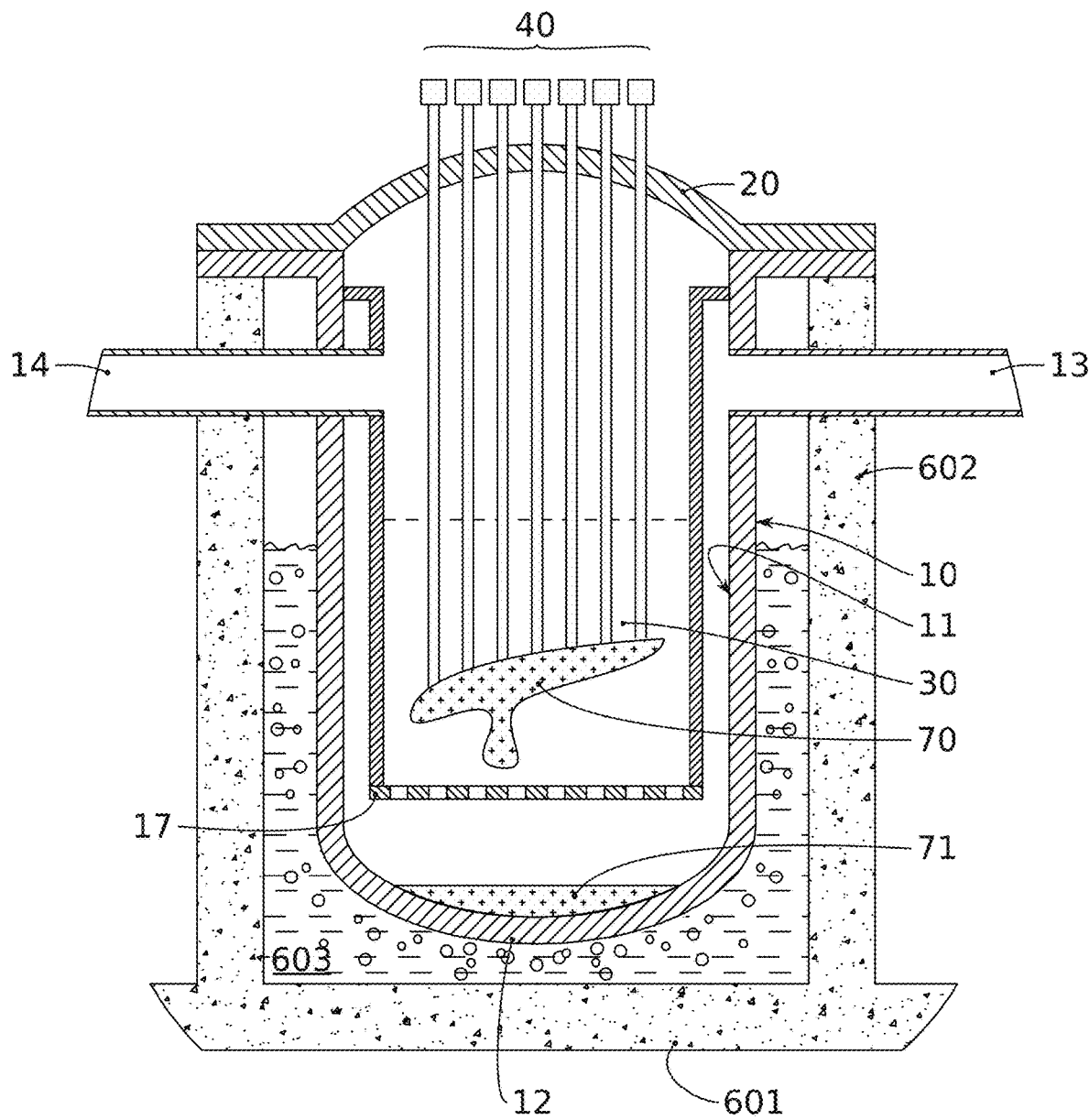
Figure 3B:
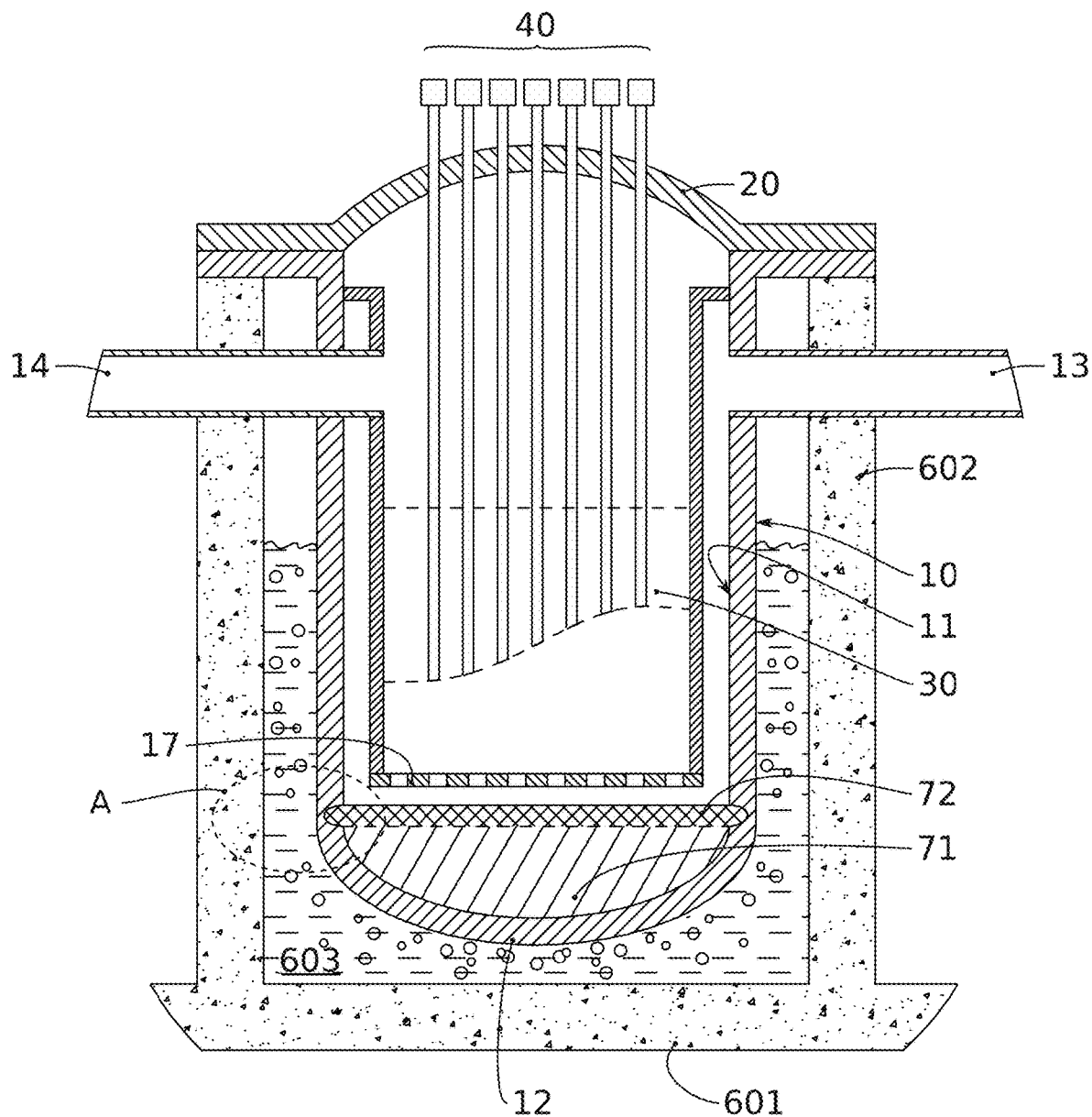
Figure 3C:
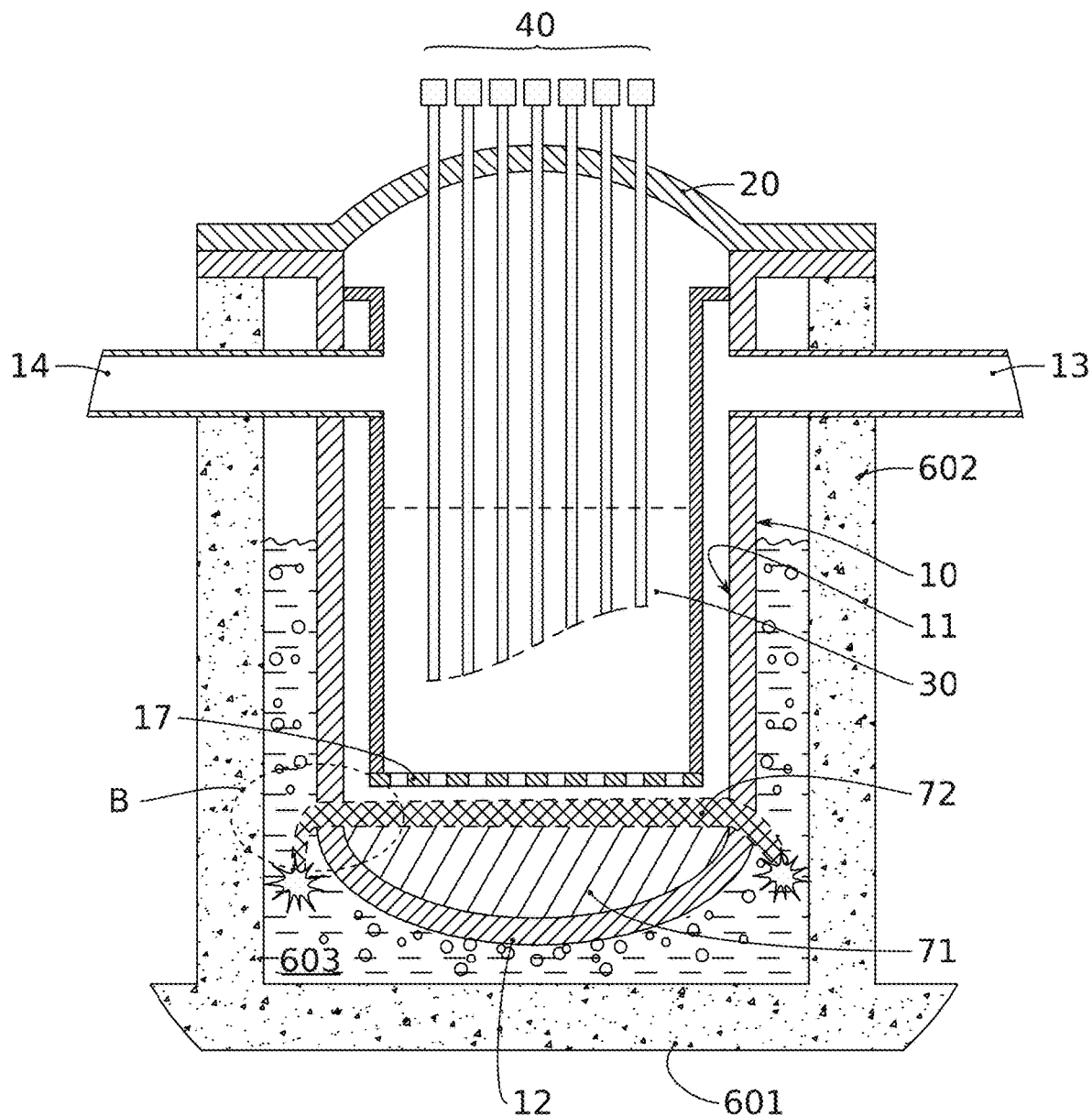
Figure 4:
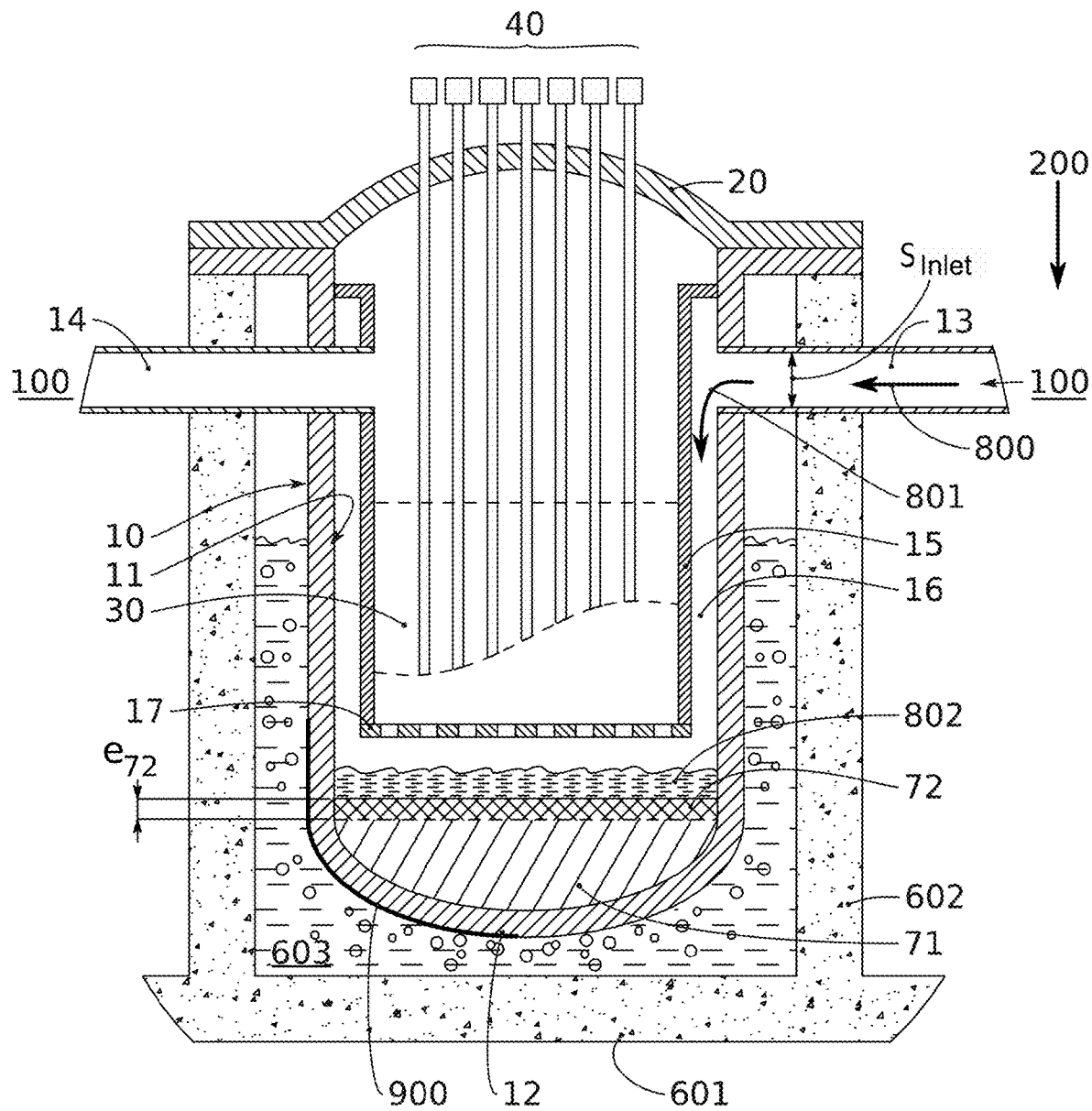

FIG. 4 illustrates a reactor 1, for example of the same type as that described with reference to FIGS. 2 to 3A.

All of the features described with reference to FIGS. 2 to 3A apply to the embodiments illustrated in FIG. 4. In this FIG. 4, the core 30 is molten or partially molten. A corium 70 bath 71 has formed in the bottom 12 of the vessel 10. At the surface of the bath 71, the liquid metal layer 72 has formed or is about to form.

Before this liquid metal layer 72 starts piercing the vessel 10 or rapidly after the beginning of this partial piercing, it is provided to pour a cooling fluid in the bottom 12 of the vessel 10, and therefore over this layer 72.

This cooling fluid arrives from the inlets 13 and/or the outlets 14 of the primary circuit 100.

As it will be explained in detail later on, this cooling fluid consists of water from the secondary circuit 200 which flows in the primary circuit 100.

It should be noted that, conventionally, in the event of a serious accident, a depressurisation of the primary circuit 100 is triggered. This may be performed by opening a specific valve located for example at the top of the pressuriser 110. This depressurisation of the primary circuit might be triggered once a threshold temperature is reached, for example a temperature of the assembly sleeve that would reach 650° C. or more. This depressurisation of the primary circuit 100 results in the latter having a pressure lower than that of the secondary circuit 200. Typically, the pressure in the depressurised primary circuit 100 is lower than 20 bars. By the effect of the pressure difference between the primary 100 and secondary 200 circuits, the communication of these circuits 100, 200 causes a quick injection of the fluid of the secondary circuit 200 into the primary circuit 100.

According to a particularly advantageous embodiment, the fluid 800 of the secondary circuit 200 spills out into the primary circuit 100 and reaches the interior of the vessel 10 through the inlet 13. Preferably, the reactor 1 comprises an inner envelope 15, located inside the vessel 10, enveloping the core 30 and defining together with the inner wall 11 of the vessel 10 an annular volume, commonly called downcomer 16 (descending portion). This inner envelope 15 is configured so that, during the normal operation of the reactor 1 (that is to say in the absence of a serious accident for example):

the inlet 13 opens into the outside of the envelope 15 and into the downcomer 16 so that the cold fluid coming from the inlet 13 is guided up to the bottom 12 of the vessel 10, the outlet 14 opens into the inside of the envelope 15 so that the hot fluid present in the core 30 could come out of the reactor 1 through the outlet 14.

Thus, during the normal operation of the reactor 1, the cold fluid of the primary circuit 100 penetrates into the reactor 1 through the inlet 13; descends by gravity in the downcomer 16 to reach the bottom 12 of the vessel, rises inside the envelope 15 while passing through an aperture plate commonly called support plate 17; crosses the core 30 to extract heat derived from the fission and comes out of the reactor 1 through the outlet 14.

In the context of the implementation of the present invention, the cooling fluid derived from the secondary circuit 200 and which penetrates 801 into the vessel 10 via the circuit 100 therefore also descends along the wall 11 of the vessel 10 and reaches the liquid metal layer 72. Hence, this safety cooling fluid follows the natural route of water in the reactor 1. This cooling fluid comes into contact with the surface of the liquid metal layer 72. More specifically, the cooling fluid reaches the liquid metal layer 72 at the most critical location, i.e. at the interface between the latter and the wall 11 of the vessel 10. Hence, the cooling fluid ensures a cooling function over the entire periphery where the liquid metal layer 72 is likely to pierce the inner wall 11 of the vessel 10 by focusing effect. Hence, a cooling fluid supply from the downcomer 16 provides a particularly effective solution to reduce the risk of piercing of the vessel by focusing effect.

Also advantageously, this mode of contacting liquid water with the overmelting metal layer 72 is performed by run-off from the inner wall of the vessel 10, which is much softer than a heavy injection of water onto the corium bath. A heavy injection of water onto the corium bath could cause a steam shock which is detrimental to the integrity of the vessel of the reactor.

In FIG. 4, the cooling fluid is represented in the form of a body 802 spread over the free surface of the metallic layer 72. Naturally, when the latter is still not cooled down enough, the cooling fluid vaporises on contact with the metallic layer 72.

It should be noted that it is highly preferably to keep the depressurisation valves of the primary circuit 100 open, in order to evacuate steam produced upon contact of the cooling fluid derived from the secondary circuit 200 with the liquid metal layer 72. Moreover, the depressurisation of the primary circuit 100 facilitates the injection of the cooling fluid from the secondary into the vessel 10.

Thus, this cooling fluid allows cooling down the liquid metal layer 72 when the latter has a thickness $e_{72}$ that is thin enough to concentrate the thermal power of the bath 72 on a too reduced surface such that it could pierce the inner wall 11 of the vessel 10.

Pouring of this cooling fluid is carried on until the thickness $e_{72}$ of the liquid metal layer 72 is large enough for the thermal power of this layer 72 to be transmitted over a larger surface and therefore the power per surface area is low enough to prevent piercing of the inner wall 11 of the vessel 10.

As illustrated in FIG. 4, it is also provided for a cooling of the outer wall of the vessel 10. For this purpose, it is possible to soak the well 603 of the vessel 10, i.e. water is injected or poured between the vessel 10 and the well 603. This cooling is usually sufficient in case of an IVR-type (in-vessel retention) accident, yet naturally not if the focusing effect phenomenon appears.

Indeed, cooling from outside the vessel by soaking the well 603 of the vessel 10, allows, for example, extracting 1 Megawatts per square meter (1 MW/m$^2$). In a focusing effect situation, this cooling is no longer enough, since it is necessary to be able to extract 1.5 MW/m$^2$, and even 2 MW/m$^2$, in the area in which the focusing effect creates a piercing of the vessel 10.

According to a non-limiting example, to soak the well 603 of the vessel 10, it is possible to use the water contained in a tank, for example in the fuel loading pool. This tank could be used in the building of the reactor or outside the latter. Preferably, at least one portion of this tank shall be disposed high enough with respect to the vessel 603 to enable a flow into the latter by gravity. Most often, at least one portion of this tank shall be located above the cap or cover 20 of the reactor 1.

According to one embodiment, the flow rate of the cooling fluid derived from the secondary circuit 200 is not monitored. In contrast, modelling of this flow rate can be easily computed once the pressure of the secondary circuit 200, and optionally of the primary circuit 100, is known. It is primarily the initial water stock of the steam generators 210, and the section $S_{breach}$ of the passage(s) between the secondary circuit 200 and the primary circuit 100 that determines the cooling duration. The calculations show that a quite limited portion of this total stock of the steam generators 210 is enough to sufficiently cool down the overmelting metallic layer 72, and avoid piercing of the vessel 10, while the metallic layer 72 at the surface sufficiently thickens.

Typically, the safety device is configured so that the passage section $S_{breach}$ of the passage(s) between the secondary circuit 200 and the primary circuit 100 enables the secondary water to come into the vessel 10 with a flow rate lower than 10 kg/s and preferably lower than 7 kg/s. Typically, this flow rate is comprised between 4 and 5 kg/s for an initial pressure (that is to say before opening of the passage(s) towards the primary circuit 100) in the steam generator (GV) in the range of 68 bar.

This allows having a sufficient cooling of the liquid metal layer over a duration long enough to avoid piercing of the vessel.

According to a non-limiting example, in order to monitor this cooling time, it is possible to provide for finely calibrating the section $S_{breach}$.

According to one example, $S_{breach}$ is smaller than 20 cm$^2$ (10$^{-2}$ meters). Preferably, $S_{breach}$ is larger than 2 cm$^2$. According to one example, $S_{breach}$ is comprised between 2 cm$^2$ and 20 cm$^2$. Advantageously, it is comprised between 2 cm$^2$ and 7 cm$^2$.

Figure 7:
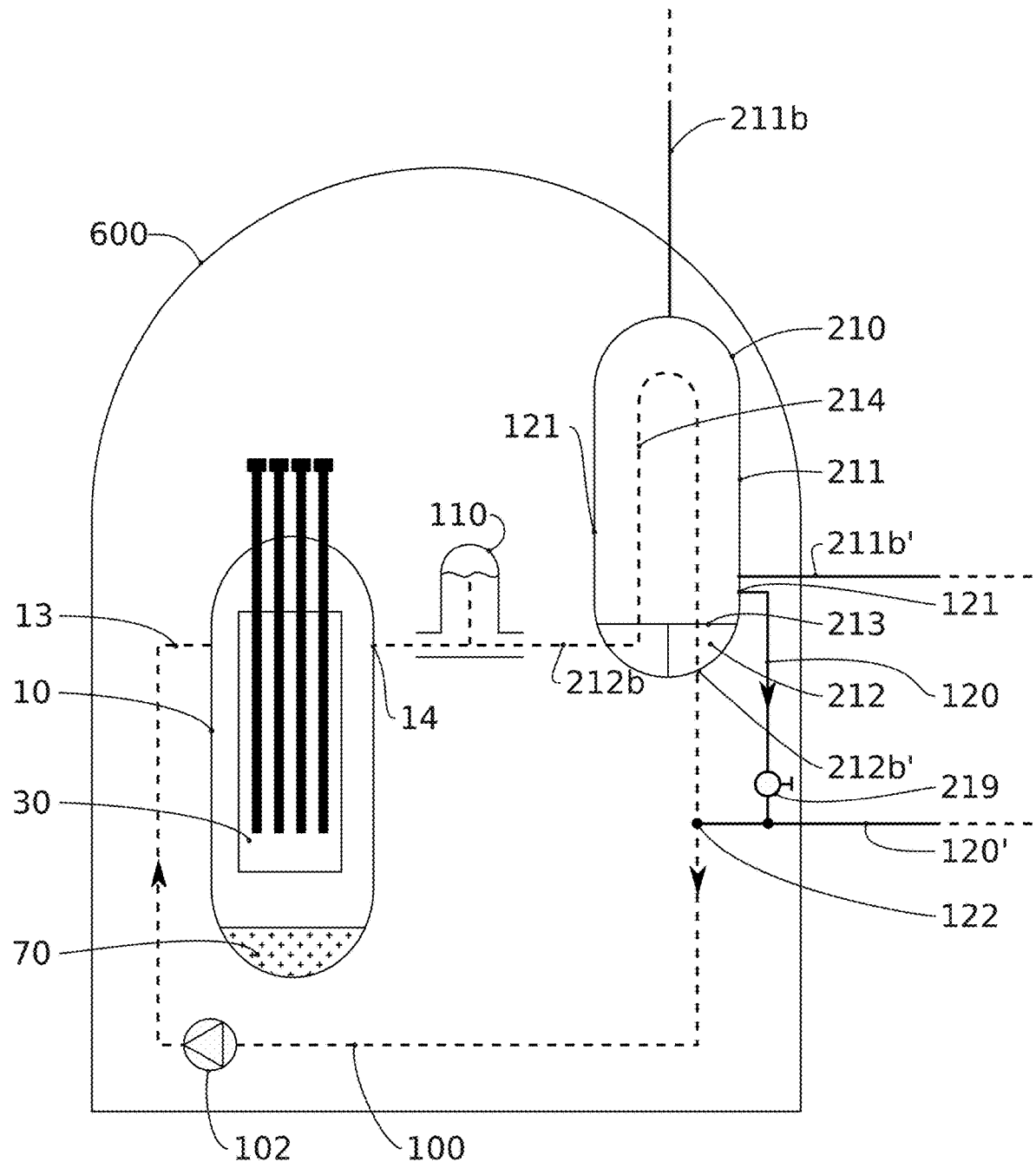
FIG. 7 illustrates, in an enlarged view, the hydraulic connections between the vessel and the steam generator according to a first embodiment of the invention.
Figure 8:
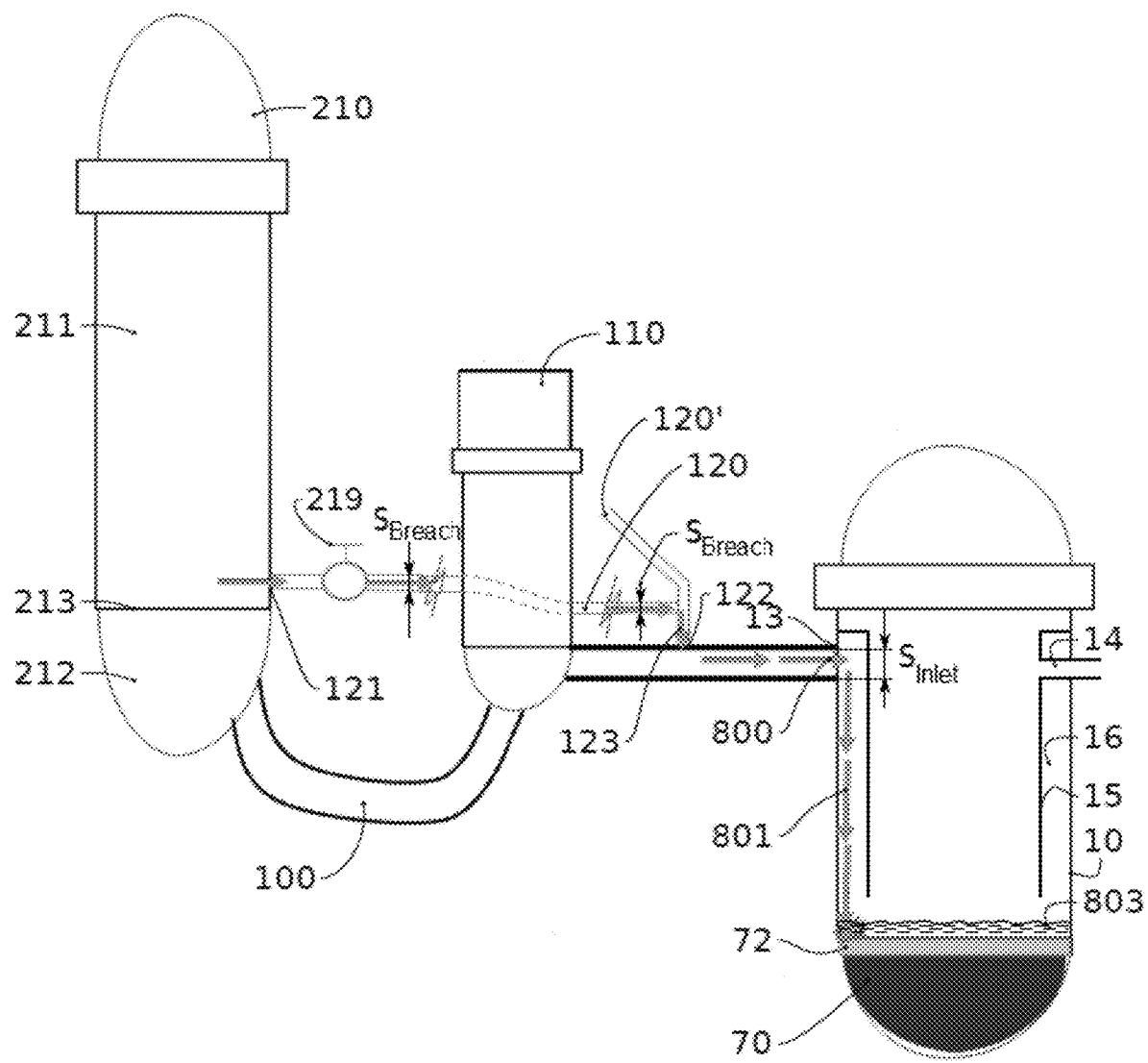
FIG. 8 is a schematic sectional illustration of a variant of the embodiment illustrated in FIG. 7.

$S_{inlet}$ is the minimum passage section between the primary circuit 100 and the inlet 13 of the vessel 10. Typically, it therefore consists of the minimum section for the passage of the primary fluid during normal operation of the reactor. For example, $S_{inlet}$ corresponds to the section of the inlet 13 in the vessel. This section is illustrated in FIG. 8. If there are several inlets of the primary circuit 100 in the vessel 10, for example as illustrated in FIG. 7, then $S_{inlet}$ is the sum of all inlets of the vessel 10.

$S_{breach}$ is the section of the passage, or the sum of the sections of the passages when there are several passages, setting the secondary fluid present in the at least one steam generator 210 in fluidic communication with the primary circuit 100.

The inlet section on the cold branch side of the reactor vessel is much larger than the section of the breach created between the secondary circuit and the primary circuit. Typically, according to a non-limiting example, $S_{breach}<0.05*S_{inlet}$ and preferably $S_{breach}<0.01*S_{inlet}$ and preferably $S_{breach}<0.005*S_{inlet}$.

Typically, the passage section of the primary fluid on the cold branch side is in the range of 6000 cm$^2$.

Typically, the pressure of the water contained in a steam generator 210 is in the range of 60 to 70 bars. In turn, the primary circuit 100 is depressurised. Indeed, devices for opening valves at the level of the pressuriser 110 are actuated to depressurise the primary circuit 100, should a serious accident arise. This allows avoiding ejections of fission products of the core under pressure in case of piercing of the vessel. Moreover, this depressurisation of the primary circuit allows facilitating the injection of the secondary inside the vessel 30.

In most scenarios leading to the serious accident, the secondary circuits are closed and isolated, on the one hand, by the closure of the Steam Injection lines leading to the turbine and, on the other hand, by the Atmospheric Discharge Valves.

According to one example, triggering of the safety device is performed by an operator. In order to determine the time point at which the fluid of the secondary circuit 200 should be poured into the primary circuit 100, it is advantageous to be able to estimate the height of the corium bath and preferably the profile of the evolution of this height.

To this end, it is possible to provide for one or several fuse(s) 900 disposed over the wall of the vessel 10. These are configured so as to melt down when a threshold temperature Tf is applied to these fuses 900. Typically, this temperature Tf is reached when corium forms in the vessel 10 and comes into contact with the fuses 900. When the temperature within the vessel corresponds to the normal operation of the reactor, the fuses 900 do not melt down. According to one example, Tf>400° C., preferably Tf≥500° C., preferably Tf≥600° C.

When a fuse 900 melts down, it prevents the passage of an electric signal. The resistance of the circuit integrated to this fuse is therefore infinite.

The fuse comprises a core made of an electrically-conductive material and a sheath which is electrically-insulating. Thus, a short-circuit between the metallic vessel and the conductive core is avoided.

For example, the core is made of a metal such as aluminium whose melting point is close to 600° C., or of antimony. For example, the insulating sheath is made of a ceramic.

For example, the fuse forms a cable having two ends connected to the safety device and an elbow located between these two ends. The elbow corresponds to the lowermost point of the fuse. Thus, when the fuse switches from a conductive configuration, in which the current flows in the core from one end to another (resistance R1) into a non-conductive configuration in which the current no longer flow in the core from one end to another (resistance R2>R1, preferably infinite R2), this means that the corium bath has molten the elbow. Thus, it is deduced that the height of the free surface of the corium bath corresponds to the height of the elbow of the fuse 900 with respect to the bottom of the vessel 10.

The use of a fuse turns out to be much more robust and reliable than the use of temperature sensors.

Preferably, the fuse is positioned on the inner wall 11 of the vessel 10. This allows enhancing the reliability of the detection of the apparition of the Focusing effect. Indeed, by placing the fuse on the outer wall of the vessel 10, the temperature measurement will essentially depend on the boiling temperature of water in contact with the wall of the vessel, which does not allow effectively detecting the rise of the corium bath, as well as the formation of the Focusing Effect layer.

Preferably, the safety device comprises a series of fuses 900 positioned along at least one generatrix of the inner wall 11 of the vessel 10. Preferably, the fuses are positioned along at least two generatrices. Thus, if a corium stream occurs along a generatrix, fuses placed at the upper portion might be reached and not characterise the progressive rise of the corium bath at the bottom of the vessel.

Preferably, for each generatrix, a series of fuses 900 is disposed over a generatrix of the hemispherical portion forming the bottom 12 of the vessel 10, the latter and another portion of the fuses is disposed over a lateral wall of the vessel 10.

These fuses allow determining the time point at which the corium bath 71 starts forming as well as the time point at which water from the secondary should be injected into the primary circuit 100.

For example, depending on the profile of evolution of the height of the corium bath, which height of the corium bath is estimated according to the signals sent by the fuses, it is possible, by simulation, to decide on the most appropriate time to trigger the injection of water from the secondary into the primary circuit 100.

The profile of evolution of this temperature also allows detecting the rise of the corium level in the vessel 10. This profile also allows detecting the beginning of piercing of the latter by the liquid metal layer 72.

For example, it is possible to provide for fuses 900 of the same generatrix, or for fuses 900 of two different generatrices, having different melting temperatures. For this purpose, it is possible to provide for different materials for the sheath and/or the core of the fuses. It is preferably to provide for a device that is fully dismountable and replaceable, for example during a ten-year inspection, in order to be able to have a set that is essential for safety whose service life does not exceed 10 years of reactor operation.

According to a particularly advantageous example, it is desired to position corium bath height detectors so that the rate of rise of the corium bath is revealed by the fuses. This allows monitoring more accurately the time point at which the focusing effect could occur and the time point at which the fluid of the steam generators 210 should be poured into the primary circuit 100. Thus, this positioning of the fuses 900 is performed so that the volumes $V_{slice}$ of the core slices located between two consecutive or neighbouring fuses 900 are constant.

More specifically, two neighbouring fuses according to a vertical distribution, define a vessel slice. This vessel slice is delimited, on the one hand, by the inner wall 11 of the vessel 10 and, on the other hand, by two vertical planes, each vertical plane passing through one of these neighbouring fuses 900. At least some, preferably all, of the volumes of the vessel slices are identical. Preferably, the neighbouring fuses according to a vertical distribution are disposed according to the same curve preferably forming a generatrix of the vessel 10.

Figure 5:
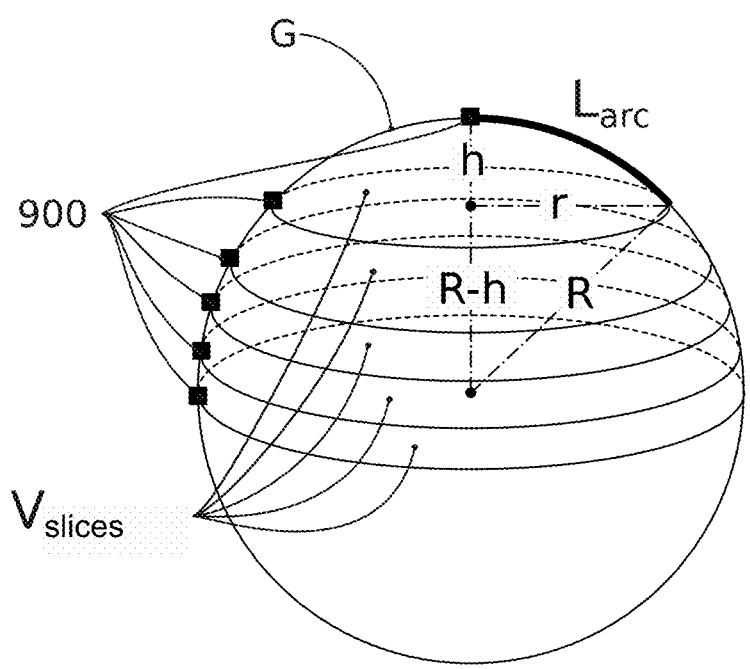
FIG. 5 illustrates, in a very schematic way, a vessel portion and the parameters allowing positioning fuses along a generatrix of the vessel.

FIG. 5 shows, in a very schematic way, a portion of the vessel 10, as well as fuses 900 disposed according to a generatrix G. The fuses 900 define slices with substantially equal volumes $V_{slice}$.

Thus, if the rate of formation of the corium bath (and therefore the rate of formation of the corium volume) is constant, the fuses of the same generatrix are reached by the corium bath with identical time intervals between two successive fuses of this generatrix.

Referring to FIG. 5, an example of calculation of the position of the fuses will now be described.

In this example, the fusible detectors are placed along 2 to 4 generatrices evenly distributed around the axis of the hemispherical bottom of the vessel 10. Thus, for a number of generatrices equal to 2, 3 and 4 respectively, these generatrices will be separated by an angle of 180°, 120° and 90° respectively.

It is considered that the bottom of the vessel 10 is formed by a sphere portion, the sphere having a 4-meter diameter.

It is desired to position corium bath height detectors corresponding to 3, 6, 9, 12 and 15 m³ of spilled corium. This allows determining the profile of the corium bath rise. By having a clear picture of the variation of the rate of rise of the corium bath, the operator (or the automatic safety device) could determine which time is the most appropriate to trigger the injection of water of the steam generators 210 into the primary circuit 100.

The total filling of the hemispherical bottom is 16.75 m³.

In FIG. 5, the following parameters are referenced:

R=radius of the hemispherical portion of the vessel, h=height of the fuse with respect to the bottom of the vessel, $L_{arc}$=length, along the wall of the vessel, between the bottom of the vessel and the position of the fuse r=distance between the axis of the cylinder of the cylindrical portion of the vessel 10 (namely the axis, passing through the centre of the sphere and which is perpendicular to the plane P).

The plane P corresponds to the junction between the hemispherical portion of the vessel and the lateral walls of the vessel extending according to a cylinder.

The volume $V_{cap}$ of the hemispherical portion of the cube could be calculated according to the following equation:

$$V_{cap} = \frac{\pi h^2 (3R - h)}{3}$$

The position of a fuse may be determined according to the value $L_{arc}$ calculated according to the following equation:

$$L_{arc} = \arccos\left(\frac{R-h}{R}\right) * R$$

Should it be desired to dispose five fuses on each generatrix, the fuses may be disposed in the following manner in order to have a correspondence between the rise speed of the corium bath, and the meltdown of these fuses:

fuse No. 1: height h=0.738 m; $L_{arc}$=1.776 m;
fuse No. 2: height h=1.079 m; $L_{arc}$=2.185 m;
fuse No. 3: height h=1.362 m; $L_{arc}$=2.492 m;
fuse No. 4: height h=1.617 m; $L_{arc}$=2.756 m;
fuse No. 5: height h=1.860 m; $L_{arc}$=3.002 m.

Alternatively, it is possible to control the setup of the communication of the secondary circuit 200 with the primary circuit 100 based on a timetable starting from the time point where the formation of the corium bath 71 is detected thanks to the fuses 900.

By simulation, it is possible to determine well ahead that we have a duration D1 between the beginning of the formation of the corium bath 71 and the beginning of the formation of the liquid metal layer 72 at the origin of the piercing of the vessel 10. Naturally, this duration varies from one reactor to another. For some reactors, this duration D1 is about one hour. The operator shall activate the safety device at the time point t1, with t1=t0+(D1−k1), k1 being a safety factor to ensure that the secondary water is poured over the liquid metal layer 72 early enough to avoid a considerable weakening of the vessel 10, and preferably to avoid the beginning of piercing of the vessel. For example, k1 is comprised between −5 minutes and 15 minutes.

By simulation, it is also possible to determine the duration D2 between the beginning of the formation of the corium bath 71 and the time point t2 at which the liquid metal layer 72 has a thickness $e_{72}$ that is large enough to make it impossible to pierce the vessel 10.

The passage section of the passage(s) between the secondary circuit 200 and the primary circuit 100 is dimensioned so as to enable pouring, between the time points t1 and t2, a flow rate Qmin that is sufficient to cool down the liquid metal layer 72.

As indicated hereinabove, it is highly advantageous that the fluid 800 derived from the secondary circuit and which is poured over the overmelting metal layer 72 descends by running off along the wall 11 of the vessel 10. Nevertheless, alternatively or in combination with this embodiment, it is possible to provide for this fluid 800 reaching the inside of the vessel 10 by penetrating into the latter through the outlet orifice 14.

FIGS. 5A to 7 illustrate different embodiments allowing injecting the fluid of the secondary circuit 200 into the vessel 10, via the primary circuit 100.

The solutions of all these embodiments consist in setting the secondary circuit 200 in communication with the primary circuit 100. This communication is performed thanks to a safety system configured so as to break up intentionally a containment barrier that isolates these two circuits 100, 200. It should be recalled that, during a normal operation, that is to say in the absence of incidents and during the phase of electricity production of the plant, the primary 100 and secondary 200 circuits are fluidly insulated from one another.

Before describing in detail some examples of solutions, the paragraphs hereinbelow describe a conventional steam generator 210, with reference to FIG. 6. A steam generator 210 forms an enclosure which encloses the fluid of the secondary circuit 200 and at the same time encloses at least one pipe 214 through which the fluid of the primary circuit 100 circulates. Thus, the fluid of the secondary circuit 200 comes into contact with an outer wall of the pipe 214.

Figure 6:
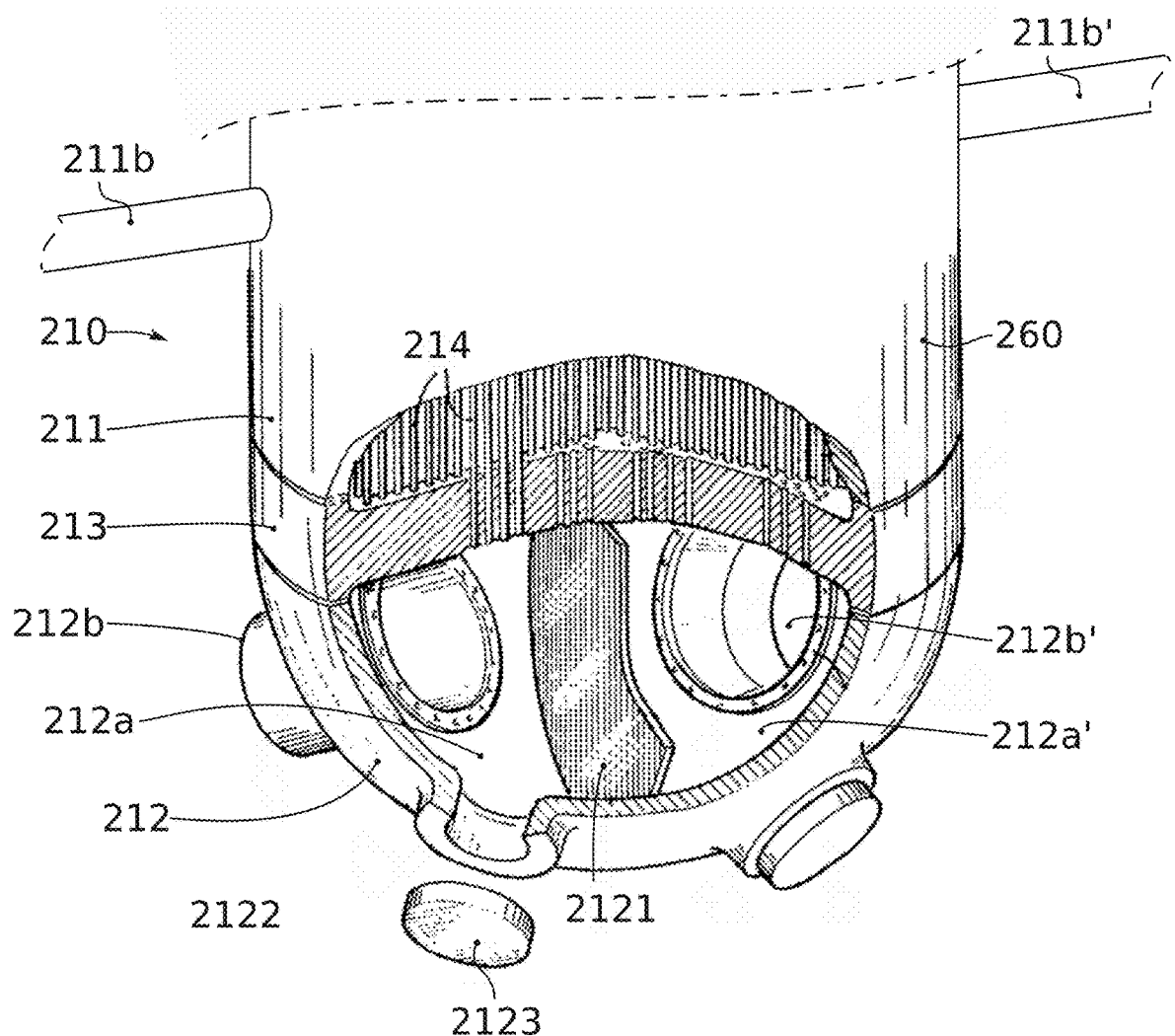
FIG. 6 illustrates an example of a portion of a conventional steam generator.

FIG. 6 illustrates a lower portion of the steam generators 210. This steam generator 210 comprises an envelope 260 with a generally cylindrical shape. This envelope 260 defines an upper portion 211, having openings 211*b*, 211*b*' in communication with the secondary circuit 200 and a lower portion 212 having openings 212*b*, 212*b*' in communication with the primary circuit 100. The upper 211 and lower 212 portions are separated by a plate 213 with tubes. A lower face of the plate 213 with tubes delimits with the lower portion 212 a volume forming a water box. Preferably, the water box has a hemispherical shape. It is separated into two portions 212*a*, 212*a*' by a partition 2121.

The portion 212*a* has an opening 212*b* hydraulically connected to the inlet 13 of the vessel 10. The portion 212*a*' has an opening 212*b*' hydraulically connected to the outlet 14 of the vessel 10. Thus, the portions 212*a* and 212*b*, as well as the tubes 214, are part of the primary circuit 100.

Pressurised water at high temperature coming from the core 30 of the nuclear reactor 1 at the outlet 14 of the vessel 10 penetrates into the portion 212*a*' of the water box and then circulates in the tubes 214 of the tube network of the steam generator 210. Indeed, the plate 213 with tubes carries a plurality of tubes 214 one end of which opens into the portion 212*a*' and another end of which opens into the portion 212*a*. Typically, these tubes 214 for inverted "U" shapes. These "U"-shaped tubes are soaking in the water of the secondary circuit 200 present in the upper portion 211 of the steam generator 210.

Thus, the pressurised hot water circulates, starting from the portion 212*a*' firstly from the bottom to the top, up to the top of the "U" elbow, and then from the top to the bottom to reach the portion 212*a* of the water box. Throughout this route, the water circulating in the tubes 214 transfers heat to the fluid of the secondary circuit 200 present in the upper portion 211 of the steam generator 210. Once it has reached the portion 212*a* of the water box, the water could then escape via the outlet 212*b* and return back to the inlet 13 of the vessel 10 to be heated up again by the core 30.

It should be noted that each of the portions 212*a*, 212*a*' of the water box is provided with a hatch opening 2122 closed by a plug 2123. This hatch opening 2122 has a dimension that is large enough to enable a human or a robot to access the inside of the water box.

First embodiments of the invention will now be described with reference to FIGS. 7 and 8.

In these embodiments, the safety system enabling an intentional break-up of the hydraulic containment between the primary circuit 100 and the secondary circuit 200 comprises at least one passage formed by a pipe 120 connecting the portion 211 of the steam generator 210 enclosing the secondary water to a pipe of the primary circuit 100. This pipe 120 may consist of a safety injection line (commonly referred to as "IS line") or a RCV (acronym of Volumetric and Chemical Control Circuit) tapping, or a tapping on the cooling circuit at the RRA stop. It should be noted that the section of an IS line or of a RCV tapping is usually smaller than the sum of the sections of the inlets 13 in the vessel 10. Yet, and as explained hereinabove, the invention perfectly operates by injecting water from the secondary into the primary circuit 100 via a small section.

More specifically, the upper portion 211 of the steam generator 210 has an orifice connected to one end 121 of a pipe 120. Another end 122 of the pipe 120 is connected, for example, by a tapping on the primary circuit 100 or on an existing line such as the IS line, a RCV tapping, or a tapping on the RRA line. Naturally, the orifice 121 is disposed in the bottom of the upper portion 211 in order to promote a flow by gravity of all of the secondary water contained in the steam generator 210.

This pipe 120 is provided with a device allowing:
- in a situation of normal operation of the reactor 1, that is to say in the absence of any accident, preventing any circulation of the secondary fluid therewithin,
- in a situation of abnormal operation of the reactor 1, resulting in piercing or in the risk of piercing of the vessel 10, enabling the circulation therewithin of the secondary fluid from the steam generator 210 up to the pipe of the primary circuit 100.

For this purpose, this device is configured so as to selectively enable the passage of the fluid. According to one example, this device comprises a valve 219. In a hydraulic insulation configuration, the valve 219 prevents any circulation of fluid in the pipe 120.

When the safety system is activated, the valve 219 suppresses this hydraulic insulation.

According to a first embodiment, the valve 219 is intended to be remotely controlled between a closed configuration and an open configuration. The alternating switch from the closed configuration into the open configuration being performed by activation of the valve 219. In this first embodiment, when the safety device detects piercing or an impending risk of piercing of the vessel 10, it could remotely trigger opening of the valve 219.

According to a second embodiment, the switch from the closed configuration into the open configuration is performed manually, by the action of an operator. In this second embodiment, when the safety device detects piercing or an impending risk of piercing of the vessel 10, it could trigger a signal notifying that the valve 219 shall be opened.

In this embodiment, with a dedicated pipe 120 between the envelope 15 of the steam generator 210 on the cold primary side, and a piping of the primary circuit 100, the presence of a "U" branch between the steam generator 210 and the vessel 10 does not really pose problems of filling of this "U" branch. Indeed, it is possible to ensure a flow by gravity, from the pickup of secondary water in the steam generator 210 up to the tapping 122 of the pipe 120 ensuring the inlet of water into the main cold branch 13 of the vessel 10, and then in the downcomer 16, without any lift pumping. This is illustrated in FIG. 8.

The low altitude of the steam generator 210 is located above the altitude of the hot and cold branches of the vessel 10 and of their respective orifices 13, 14, thereby enabling a flow by gravity from the envelope of the steam generator 210 up to the top of the downcomer 16. Upon opening of the valve 219 (or upon break-up of a tube 214), the secondary pressure is substantially higher than the primary pressure, and an adiabatic-type expansion occurs at the level of the break-up of the containment barrier, splitting a portion of the secondary liquid water into steam, whereas another portion remains liquid and then flows by gravity, after an initial phase of propulsion by induced spraying by the kinetic force of the steam created by the expansion.

In these embodiments, wherein the passage of the secondary fluid into the primary circuit 100 is performed by the pipe 120, the section $S_{breach}$ is equal to and preferably smaller than the minimum section of this pipe 120. Naturally, if several pipes 120 are configured to pour the secondary water into the vessel 10, then $S_{breach}$ is equal to the sum of the equivalent breach sections coming into the vessel 10.

In one embodiment, it is possible to provide for the pipe 120 being also in fluidic communication with a boron tank, for example via the tapping 120'.

It should also be noted that the same end 122 of the pipe 120 could be connected to several steam generators 210. For this purpose, a portion 123 of the pipe is fed by several branches 120, 120', each of these branches being connected to a distinct steam generator. This has the advantage of drawing in the primary circuit 100 the water trapped in several steam generators 210 while performing only one tapping 122 on the primary circuit 100, thereby reducing the impact of this solution in terms of safety.

In the example of FIG. 7, the pressuriser 110 is located between the steam generator 210 and the outlet 14 of the vessel 10, as is usually the case. In this example, the tapping 122 is located between the steam generator 210 and the vessel 10.

In the example of FIG. 8, the pressuriser 110 is located between the steam generator 210 and the inlet 13 of the vessel 10. In this example, the tapping 122 is located between the pressuriser and the vessel 10.

FIG. 9 illustrates, in a very simplified way, an embodiment in which pouring of the secondary water into the primary circuit 100 is performed by the addition of a pipe to the steam generators 210, like in the pipe 120 of the embodiment illustrated in FIGS. 7 and 8. This pipe extends between an inlet 121 and an outlet 122.

Nevertheless, the tapping of this pipe, is performed on the device 170 for cooling down the reactor at stop (which device is commonly referred to by its acronym RRA) in order to avoid a drilling of the piping of the primary circuit 100.

The RRA device 170 of the plant comprises:
- a first circuit comprising a heat-exchanger 130 whose inlet 131 and outlet 132 are connected to the primary circuit 100, preferably to cold inlets each connected to a distinct steam generator 210. In the illustrated example, for clarity, the inlet 131 and the outlet 132 are respectively connected to the hot branch and the cold branch of the same primary circuit 100. Preferably, the first circuit of this RRA device 170 is connected to the cold inlets of several, typically two, steam generators 210. Thus, the branch 131 is connected to the cold inlet of a first steam generator 210 and the branch 132 is connected to the cold inlet of a second steam generator 210.

a second circuit 140 forming a hydraulic loop in communication with the heat-exchanger 130, on the one hand, and with an additional heat-exchanger 150, on the other hand, a third outer circuit 160 in communication with the additional heat-exchanger 150 and comprising a cold source.

As in the previous example, this pipe is provided with a selective device for hydraulic insulation or for hydraulic communication, such as a valve 219. This valve 219 may be controlled manually or remotely.

Thus, an advantage of this embodiment is that the safety system of the present invention does not require performing an additional tapping on the primary circuit 100.

Thus, this embodiment allows avoiding the need to introduce additional constraints in terms of safety while providing an effective solution to fight piercing of the vessel by focusing effect.

Considering the foregoing description, it clearly appears that the invention provides a reliable and robust solution to considerably improve the safety of a PWR-type nuclear reactor, in particular in case of loss of coolant from the primary circuit.

Advantageously and as described hereinabove, the communication point between the primary circuit and the secondary circuit is selected such that the propagation of secondary water towards the primary circuit takes place almost exclusively on the cold branch side of the primary circuit. Thus, the water of the steam generators will follow the primary cold branches before flowing by gravity in the downcomer, where piercing of the vessel by focusing effects takes place.

The invention is not limited to the previously-described embodiments and extends to all embodiments covered by the claims.

Naturally, the invention is not limited to a reactor having the structure illustrated in FIG. 4 and numerous variants could be made to this reactor yet without departing from the scope defined by the claims.

In particular, only one inlet 13 and one outlet 14 are represented in the figures. Preferably, the reactor 1 comprises several inlets and several outlets. Preferably, it also comprises several steam generators 210.

The invention claimed is:

1. A pressurised water nuclear reactor, the reactor comprising:
    a reactor vessel accommodating a reactor core, the vessel comprising an inlet and an outlet,
    a primary circuit in which a water-based primary fluid is able to circulate,
        wherein the primary circuit comprises a first end connected to the inlet of the reactor vessel,
        wherein the primary circuit comprises a second end connected to the outlet of the reactor vessel,
            wherein primary fluid circulating in the primary circuit is able to flow into the reactor vessel through the inlet and flow out of the reactor vessel through the outlet after passing through the reactor core in order to extract heat produced by the reactor core,
    a secondary circuit in which a water-based secondary fluid is able to circulate,
        wherein the secondary circuit is fluidly isolated from the primary circuit, wherein the secondary circuit comprises a steam generator,
        wherein the secondary circuit is configured to absorb heat of the primary circuit and transform at least part of the heat into steam in the steam generator, and
    a safety system,
        wherein the safety system comprises a passage between the secondary circuit and the primary circuit,
        wherein the safety system comprises a safety device configured to control fluid flow in the passage,
            wherein the safety device is configured to place secondary fluid present in the steam generator in fluidic communication with the primary circuit, so that secondary fluid from the steam generator can flow through the passage, into the primary circuit, and then into the reactor vessel,
            wherein the inlet has a cross sectional area ($S_{inlet}$), the passage has a minimum cross sectional area ($S_{breach}$), and $S_{breach} < 0.05 * S_{inlet}$.

2. The reactor according to claim 1, wherein the minimum cross sectional area $S_{breach}$ is between 0.2 cm$_2$ and 20 cm$^2$.

3. The reactor according to claim 1, further comprising a fuse disposed on a wall of the reactor vessel, the fuse being configured so that, when a liquid metallic layer reaches the fuse, the liquid metallic layer makes the fuse melt down, a melting temperature of the fuse being higher than or equal to a temperature threshold Tf, with Tf≥400° C.

4. The reactor according to claim 3, further comprising a plurality of fuses distributed according to a generatrix of a wall of the reactor vessel, the plurality of fuses are distributed along the generatrix so that two neighbouring fuses of the plurality of fuses according to the generatrix, define a vessel slice, in which volumes $V_{slice}$ of the vessel slices are identical.

5. The reactor according to claim 1, wherein the reactor comprises an inner envelope, located inside the reactor vessel, enveloping the reactor core and defining with an inner wall of the reactor vessel an annular volume, the annular volume being configured so that, during normal operation of the reactor:
    the inlet opens into an outside of the inner envelope and into the annular volume so that the primary fluid coming from the inlet is guided to a bottom of the reactor vessel,
    the outlet opens into an inside of the inner envelope so that the primary fluid present in the reactor core flows out of the reactor through the outlet,
    the reactor being configured so that when the safety device allows fluid flow in the passage between the secondary circuit and the primary circuit, the secondary fluid contained in the steam generator then flows to the bottom of the reactor vessel while passing beforehand through said inlet of the reactor vessel and then through the annular volume.

6. The reactor according to claim 1, wherein the steam generator comprises an outer envelope comprising a first portion enclosing a part of the primary fluid and a second portion enclosing a part of the secondary fluid, the first and second portions being fluidly isolated from one another,
    the safety system comprising a pipe forming said passage, the pipe located outside the steam generator and having:
        a first end opening into the second portion enclosing the secondary fluid, and a second end opening into a branch of the primary circuit located between the steam generator and the reactor vessel, the safety device including a member mounted on said pipe and selectively allowing:
- a closed configuration in which the member prevents flow of the fluid in said pipe, and
- an open configuration in which the member enables flow of the fluid in said pipe, thereby enabling the secondary fluid of the steam generator to flow in said pipe to join the primary circuit and then the reactor vessel.

7. The reactor according to claim 6, wherein the second end of the pipe forms a tapping on the branch of the primary circuit.

8. The reactor according to claim 6, comprising a device selected amongst a safety injection line and a line of a volumetric and chemical control circuit, said device being configured so as to open into the primary circuit at said second end of the pipe.

9. The reactor according to claim 6, wherein the member is a valve selected amongst: a manually-operated valve, a remote-controllable valve.

10. The reactor according to claim 1, wherein the steam generator comprises a first portion enclosing the primary fluid and a second portion enclosing the secondary fluid, the first and second portions being fluidly isolated from one another, the reactor further comprising a cooling device for cooling down the reactor at shutdown, the cooling device comprising a cooling circuit comprising a heat-exchanger and branches fluidly connecting the heat-exchanger to a portion of the primary circuit, the safety system comprising a pipe located outside the steam generator, the pipe forming said passage and having:
- a first end opening into the second portion enclosing the secondary fluid,
- a second end opening into a branch of said cooling circuit of the cooling device, the safety device including a member mounted on said pipe and selectively allowing:
- a closed configuration in which the member prevents flow of the fluid in said pipe,
- an open configuration in which the member enables flow of the fluid in said pipe, thereby enabling the secondary fluid of the steam generator to flow in said pipe to join a branch of said cooling circuit, and then the primary circuit and then the reactor vessel.

* * * * *